UNITED STATES PATENT OFFICE.

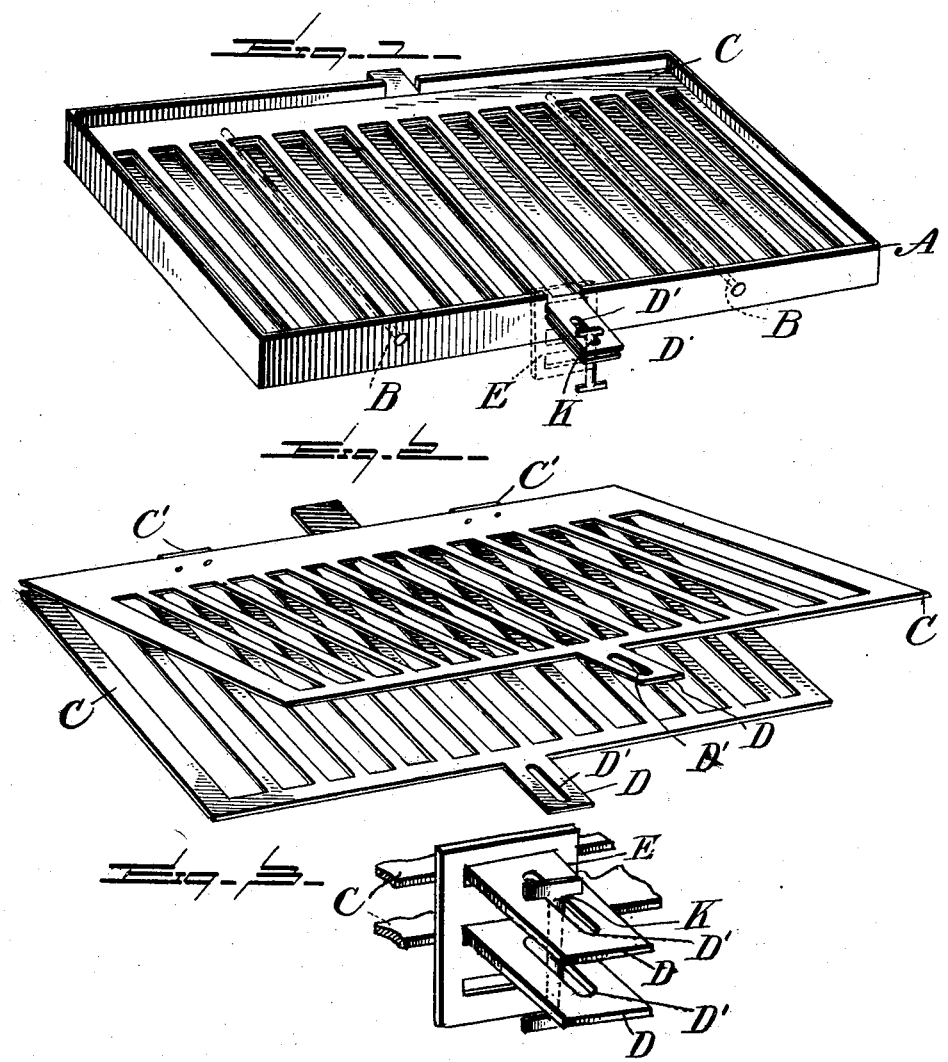

ELLEN E. TOBIN, OF PORTLAND, MAINE.

BROILING-OVEN.

SPECIFICATION forming part of Letters Patent No. 678,308, dated July 9, 1901.

Application filed April 20, 1901. Serial No. 56,740. (No model.)

*To all whom it may concern:*

Be it known that I, ELLEN E. TOBIN, a citizen of the United States, residing at Portland, in the county of Cumberland and State of Maine, have invented certain new and useful Improvements in Broiling-Ovens; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in broilers for gas and other ovens; and it consists in the provision of a pan of any suitable shape having transverse rods or wires extending between the side walls and in the provision of two broiling-grates which are hinged together at corresponding edges and provided with adjustable means for holding the free edges apart and locking same in an adjusted position, the free edges of the broiling-grates being provided with handles which are adapted to rest in notches in one side or the other of the pan, accordingly as the broiler is turned in one direction or the other.

The invention will be hereinafter more fully described and then specifically defined in the appended claims and is clearly illustrated in the accompanying drawings, which, with the letters of reference marked thereon, form part of this application, and in which drawings—

Figure 1 is a perspective view showing my broiler as adjusted in place within the pan. Fig. 2 is an enlarged detail view of the broiler. Fig. 3 is a detail view of the adjusting device for holding the free edges of the broiler together, and Fig. 4 is a plan view showing the rods in the pan on which the broiler rests and on which rods the broiler is turned or reversed.

Reference now being had to the details of the drawings by letter, A designates a pan of any suitable construction, which is provided with two horizontally-disposed rods B, extending between the longitudinal walls of the pan, which walls are notched on opposite edges, as shown. The broiler comprises the two jaws or grates C, which are hinged together at C' along their longitudinal edges. Each free edge of the jaws is provided with a handle D, which is slotted, as at D'. These handles are adapted to be seated in one or the other of said notches when the broiler is placed within the pan and resting upon said rods. A catch E, having one or more elongated slots therein, is placed over said handles to hold the same nearer to or farther apart, and to hold said catch in place I provide a link K, which has right-angled ends and which is adapted to be placed in registering apertures or slots in said handles after the catch has been adjusted in place. When said link, with its cross-heads, is placed in the registering slots, it may be turned at right angles, thereby holding said link within the slots in the handle and the latch in an adjusted position.

When it is desired to turn the broiler, the handles are grasped and raised and the hinged edges of the jaws are allowed to rest upon said rods and slid from one longitudinal side of the dish or pan to the other, and when the broiler has been reversed the handles are allowed to rest in the other notch in the longitudinal edge of the pan.

What I claim is—

1. A broiler, comprising in combination with a pan having horizontally-disposed rods therein, the jaws hinged together and provided with handles and adjustable means for holding said handles together, the walls of the pan being notched to receive said handles, as set forth.

2. In combination with the broiler comprising two jaws hinged together, and having slotted handles, a slotted plate held over said handles, and designed to hold the latter in adjusted positions, and means for holding said plate in place, as set forth.

3. In combination with the jaws of a broiler hinged together and provided with slotted handles, a plate having a plurality of slots, designed to engage over said handles, and a link with cross-heads adapted to engage said slots, and retain said plate, as set forth.

In testimony whereof I hereunto affix my signature in presence of two witnesses.

ELLEN E. TOBIN.

Witnesses:
JENNIE TOBIN,
AGNES TOBIN.